United States Patent [19]

Levy

[11] Patent Number: 5,381,191
[45] Date of Patent: Jan. 10, 1995

[54] GLASSES FOR REDUCING EYE STRAIN DURING VIEWING OF A CRT SCREEN

[76] Inventor: Chauncey F. Levy, 1299 Portland Ave., Rochester, N.Y. 14621

[21] Appl. No.: 45,710

[22] Filed: Apr. 14, 1993

[51] Int. Cl.⁶ ............................................. G02C 7/08
[52] U.S. Cl. ..................................... 351/57; 351/175
[58] Field of Search ............... 351/41, 155, 158, 175, 351/57, 59, 61

[56] References Cited

U.S. PATENT DOCUMENTS

| | | | |
|---|---|---|---|
| 1,905,675 | 4/1933 | Baker | 351/59 |
| 2,594,698 | 4/1952 | Thomas | 351/175 |
| 4,152,051 | 5/1979 | Van Tiem et al. | 351/155 |
| 4,781,451 | 11/1988 | McAllen | 351/155 |
| 4,892,384 | 1/1990 | Okamoto | 351/175 |
| 4,961,639 | 10/1990 | Lazarus | 351/175 |
| 5,076,665 | 12/1991 | Petersen | 351/175 |
| 5,204,702 | 4/1993 | Shapiro | 351/175 |

Primary Examiner—William L. Sikes
Assistant Examiner—David R. Parsons
Attorney, Agent, or Firm—Birch, Stewart, Kolasch & Birch

[57] ABSTRACT

A pair of glasses for use by an individual viewing a CRT screen for easing eye strain includes a pair of lenses, each of the lenses includes a prism disposed within the thickness of the lens for refracting light from an object to a user's eye for moving the light to avoid normal convergence of the individual's eyes for reducing eye strain as an individual views a CRT screen. Frames are provided for securing the pair of lenses in an operative position relative to a user's eyes.

3 Claims, 3 Drawing Sheets

GLASSES FOR REDUCING EYE STRAIN DURING VIEWING OF A CRT SCREEN

BACKGROUND OF THE INVENTION

1. Field of the Invention

The present invention is directed to a pair of glasses adapted to be used by an individual viewing a CRT screen for easing eye strain.

2. Description of Background Art

CRT screens are in common use in both the workplace and the home. Individuals viewing a CRT screen for extended periods of time are developing an eye problem which is referred to as video display terminal syndrome. This particular problem is more prevalent than other physical ailments relating to video display terminals such as carpal tunnel syndrome.

The problems relating to vision as a result of viewing a CRT screen have decreased productivity and produced poor performance. The major problems relate to eye strain, headaches, blurred vision, dry or irritated eyes, neck or back aches, photophobia (sensitivity to light), double vision and after images. In addition, symptoms relating to blurred distance vision and crossed eyes are also prevalent. These symptoms occur when high visual demands are placed on an individual for tasks which actually exceed the visual ability of the individual. Individuals have difficulty in maintaining eye alignment. The eyes normally converge on the object being viewed. However, with extended and continual viewing of a CRT, continual convergence and accommodation (close focus) tend to produce eye strain. Eye strain and head strain due to prolonged computer use in an individual is realized due to eye strain associated with prolonged and continual close viewing. The neck strain may be associated with attempting to view the screen through bifocals, when bifocals are prescribed for a user.

SUMMARY AND OBJECTS OF THE INVENTION

It is an object of the present invention to provide a pair of glasses for use by an individual viewing a CRT screen for easing eye strain.

Another object of the present invention is to provide a pair of glasses with a sufficient throw to enable an individual who utilizes prescription glasses to wear the glasses of the present invention over his present prescription glasses during the viewing of a CRT screen.

A further object of the present invention is to provide a pair of glasses which may be positioned on an individual's forehead for permitting the glasses to be disposed in an out-of-the-way location when an individual is not viewing a CRT screen.

Another object of the present invention is to provide a pair of glasses wherein the lenses are adjustable relative to the=frames to permit an individual to adjust the positioning of the prism relative to the lens of the user's eye during use of the glasses when an individual is viewing a CRT screen.

A still further object of the invention is to relieve the strain associated with prolonged use of viewing a CRT screen by a more mature individual.

These and other objects of the present invention are accomplished by means of a pair of glasses adapted for use by an individual viewing a CRT screen for easing eye strain. A pair of lenses are provided wherein each lens includes a prism disposed within the thickness of the lens for refracting light viewed by a user's eye for moving the light to avoid convergence of the individual's eye for reducing eye strain as an individual views a CRT screen plus a lens that focuses the viewer's eye at the distance of the CRT screen so as to eliminate the amount of accommodation and eye strain the viewer has to maintain to continually observe the CRT screen at that distance. Frames are provided for securing the pair of glasses in an operative position relative to a user's eyes. The frames may include an adjustment to permit the individual to adjust the positioning of the prisms relative to the user's eyes during use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
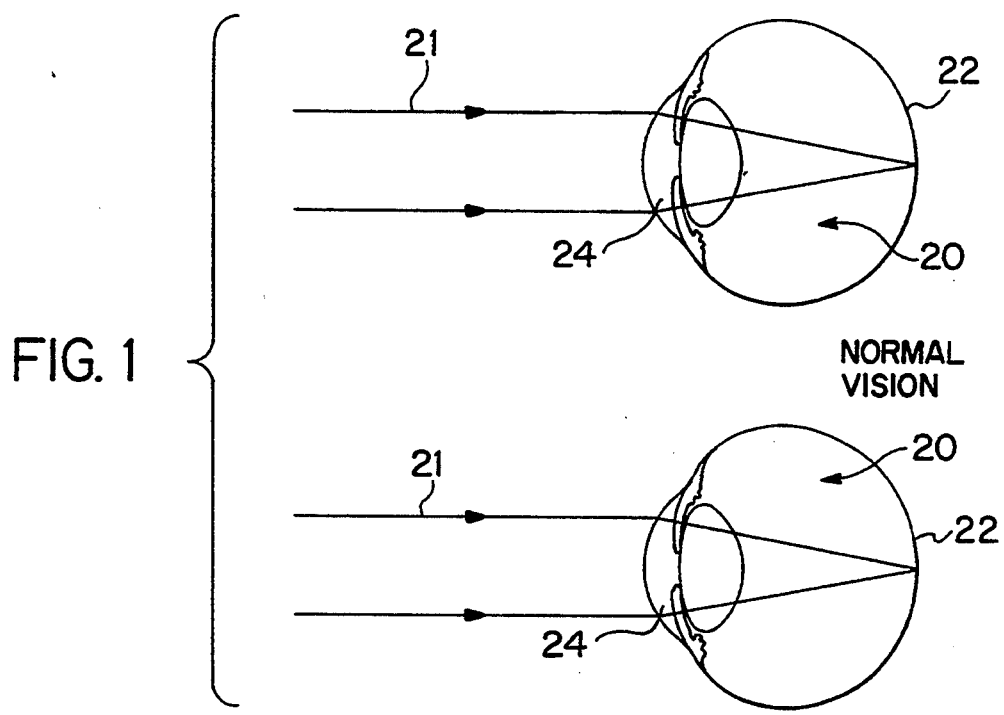
FIG. 1 is a schematic view illustrating the positioning of an individual's eyes during normal vision.

As illustrated in FIG. 1, an individual's eye 20 includes a lens 24 and a retina 22. Light rays 21 are supplied to the lens 24 of the eye and are focused on the retina to produce an image which may be detected by an individual. When an individual views an object at a distance, the muscles of the: eyes are relaxed and the eyes are directed straight ahead so that the light rays 21 may be impinged upon the lens 24 so as to focus the light onto a predetermined point on the retina 22.

Figure 2:
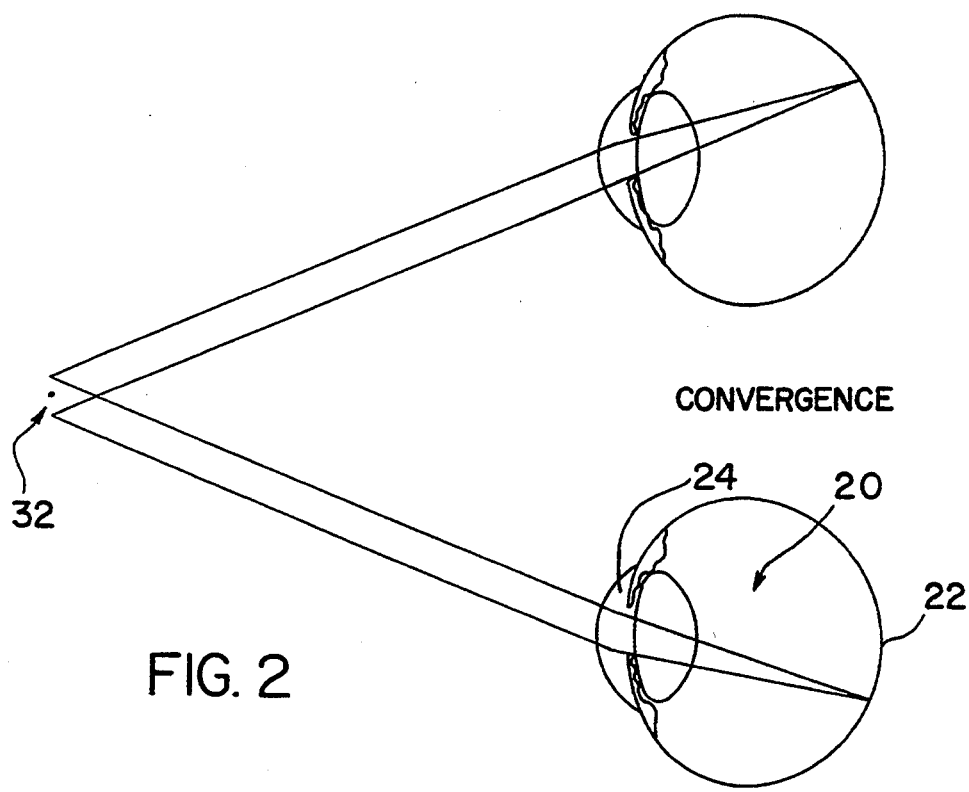
FIG. 2 is a schematic view illustrating the actuation of eye muscles to position the eyes for convergence during focusing of an individual's eyes on an object.
Figure 3:
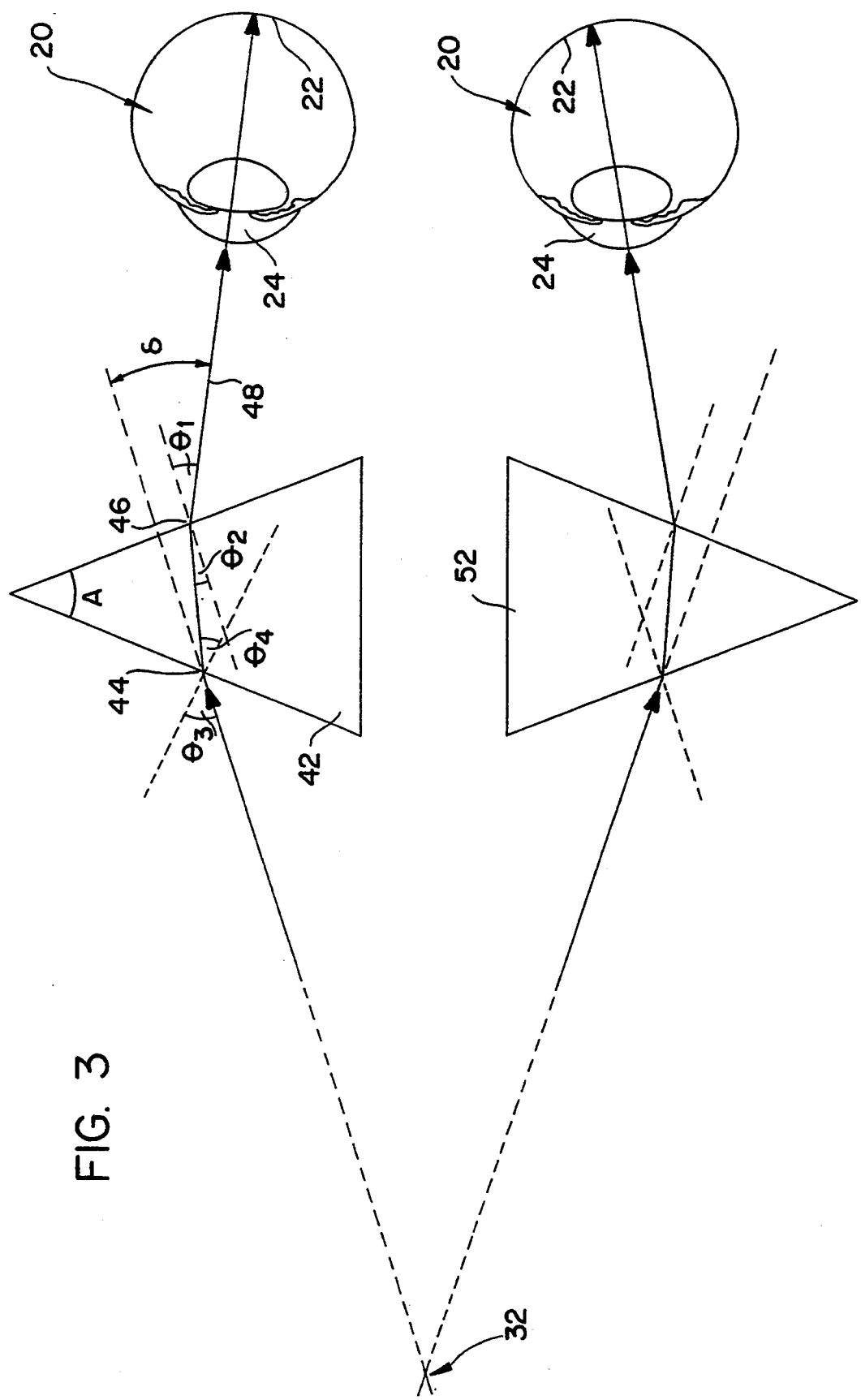
FIG. 3 is a schematic view illustrating the refraction of light which occurs in a prism to thereby permit an individual's eves to remain in a normal position even though the light is converged to focus on an object.

As illustrated in FIG. 2, when an individual views an object at close range, the muscles of the eyes have a tendency to contract and expand to move the eyes so as to converge on an object 32. Convergence is when the eyes are focused onto a close object which requires the muscles of the eyes to be utilized in order to focus on the near object. If the object is a CRT screen and an individual utilizes the CRT screen for an extended period of time, the contraction and expansion of the muscles in order to move the eyes so as to focus on the CRT screen causes the individual to develop video terminal display syndrome which is caused in part due to eye strain. As illustrated in FIG. 3, the present invention employs a prism 42 for directing the light from an object 32 to a point on the prism 44 and is thereafter refracted within the prism to a point 46. Thereafter, the ray of light 48 impinges on the lens 24 and is focused on the retina 22. By utilizing two prisms 42, 52, an individual can have convergence of the light as it comes from the object 32 while retaining the eyes 20 in the normal relaxed condition due to the fact that the prism moves the light and separates the light so as to permit the eyes to be directed straight forward while still permitting convergence onto the object due to the refraction of the light within the prisms 42, 52.

The angle of deviation is $\delta$.

$$\delta = \Theta_3 - \Theta_4 + \Theta_1 - \Theta_2$$

In addition, the angle A is equal to $\Theta_2 + \Theta_4$. When applying the law of refraction, $$\sin \Theta_3 = n \sin \Theta_4$$

$$n \sin \Theta_2 = \sin \Theta_1.$$

This law of refraction yields the following formula wherein the angle of deviation is defined as:

$$\delta = \Theta_3 + \sin^{-1}[(n^2 - \sin^2 \Theta_3)^{\frac{1}{2}} \sin A - \sin \Theta_3 \cos A] - A.$$

b 53809083.001

If the path through the prism is symmetric, the value of deviation is a minimum and is expressed as $$\delta_m = 2 \sin^{-1}\left(n \sin \frac{A}{2}\right) - A.$$

The refracted index n of the material can be determined from the angle of minimum deviation measured in the prism with a known apex angle.

Figure 4:
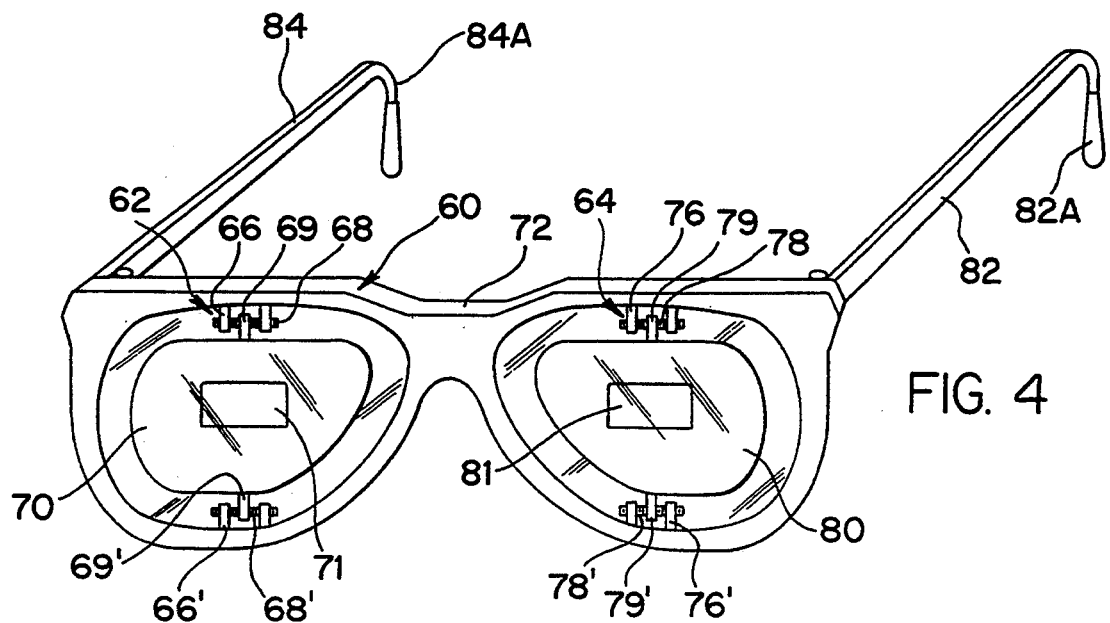
FIG. 4 is a perspective view illustrating a pair of glasses according to the present invention wherein the lenses are adjustable to permit the prisms to be moved to accommodate the particular use of an individual during viewing of a CRT screen.

FIG. 4 illustrates one embodiment of the present invention wherein a frame 60 is provided with a right lens retainer 62 and a left lens retainer 64. The right lens retainer 62 includes a mounting flange 66 having a threaded member 68 operatively connected to a bracket 69 affixed to the lens 70. Similarly, the lower portion of the right lens retainer 62 includes a flange 66' with a threaded member 68' and a mounting bracket 69' for positioning the lens 70 relative to the lens retainer 62. The threaded members 68, 68' permit the lens 70 to be laterally displaced relative to the bridge portion 72. In this way, a prism 71 disposed within the lens 70 is permitted to be laterally shifted to the right or to the left depending on an individual's particular eyesight so as to permit the glasses to function as a 1.1 diopter to 1.2 diopter glasses as the individual views an object at close range such as a CRT screen. Similarly, the lens 80 is positioned within the left lens retainer 64 by means of a flange member 76 and a threaded member 78 which is operatively disposed relative to a mounting bracket 79. Similarly, the lower portion of the lens 80 is positioned relative to the lens retainer 64 by means of a flange 76', a threaded member 78' and a mounting bracket 79'. In this way, the prism 81 may be laterally shifted to the left or to the right relative to the bridge portion 72.

In addition, as illustrated in FIG. 4, temples 82, 84 are provided with ear engaging portions 82A, 84A for affixing the pair of glasses relative to an individual's face. The throw of the glasses is such as to permit the glasses to actually fit over existing prescription glasses utilized by a particular individual. The throw, with the glasses of the present invention, refers to the distance from the cornea to the lenses, or from the front surface of a patient's glasses to the lenses (if tile patient wears glasses). In addition, the glasses may be utilized alone without the necessity of positioning the glasses over an existing pair of glasses. In other words, the glasses according to the present invention are designed to be utilized by an individual who operates a CRT screen either with normal vision or with vision which is assisted by the use of prescription glasses.

The lateral movement of the lenses 70, 80 relative to the lens retainers 62, 64, respectively, could be in the range of 1 mm to 10 mm. The lenses would be moved by actually adjusting the threaded members affixed to the flanges and mounting brackets so as to laterally displace the lenses 70, 80 relative to the frames.

Figure 5:
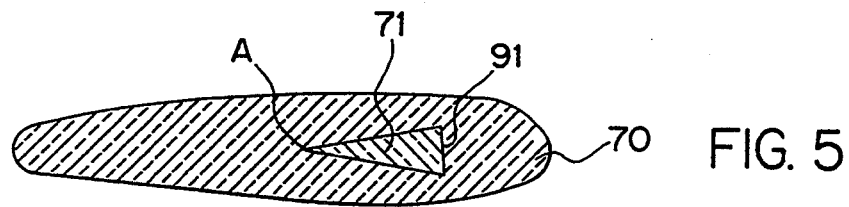
FIG. 5 is a sectional view illustrating a prism disposed within the thickness of a lens.

FIG. 5 illustrates a sectional view wherein a lens 70 includes the prism 71 disposed within the thickness of the lens 70. The base portion 91 of the prism 71 is disposed adjacent to the position of an individual's nose. The apex angle A is disposed to be directed away from the position of an individual's nose. In this way, as light impinges upon the prism 71, the light is actually separated so as to permit an individual to maintain his/her eyes in a normal position without expansion or contraction of the eye muscles while still permitting convergence of the light from the object through the prisms in the manner as illustrated in FIG. 3.

Figure 6:
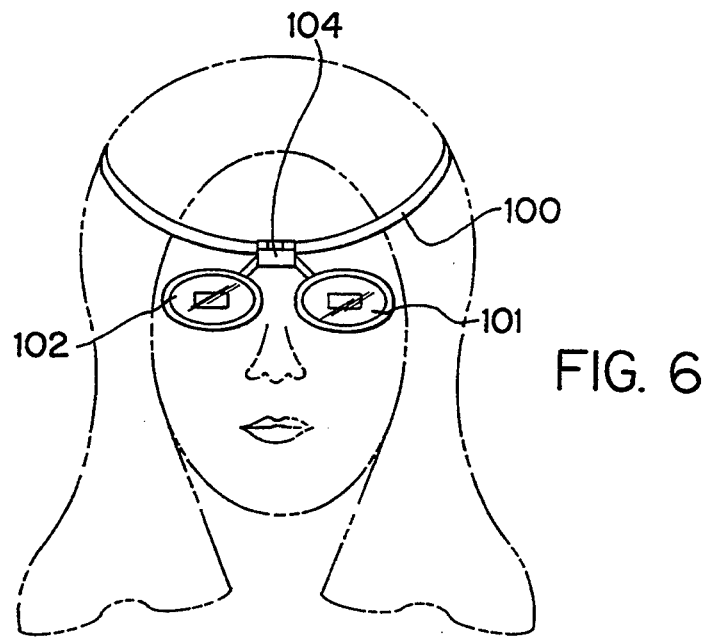
FIG. 6 is a view of another embodiment of the present invention wherein the lenses are mounted on a frame which is secured to an individual's forehead by means of a plastic or elastic band.

FIG. 6 illustrated a schematic view wherein another embodiment of the present invention is illustrated which includes a headband 100 designed to be mounted adjacent to an individual's forehead. In this way, the lenses 101, 102 may be pivoted downwardly about the hinge 104 so as to permit the lenses 101, 102 to be disposed in front of the individual's eyes. The headband 100 may be used together with prescription glasses or by an individual who does not require glasses. It is anticipated that younger individuals may be prone to use the headband 100 with the flip down lenses 101, 102 when working before a CRT screen used during the operation of a video game.

The glasses according to the present invention may be tinted to assist an individual with regard to viewing a CRT screen which is difficult for an individual to focus on. For example, the lenses may be tinted a particular color to reduce screen glare. Further, the glasses do provide more magnification to permit an individual to more readily view the information displayed on a CRT screen.

The glasses according to the present invention may be molded flat and then curved around a head mold to provide the appropriate curve and spring effect.

The glasses of the present invention may be worn separately or over existing glasses or contact lens prescription so as to place the computer screen in focus by using a 1.5 or 2.00 diopter lens (full) or equivalent lens so as to focus the eyes on a computer screen at the head-screen distance. In addition, to neutralize the amount of convergence required at that distance by moving the optical centers in from the pupillary distance the required amount to produce a base-in prism effect or to add the required base-in prism so as to reduce the strain of prolonged computer screen regard. This also produces a magnification effect such as produced by a loupe, because of the increased distance from the eye.

In another embodiment of the present invention, prisms may be positioned within the frame of the glasses without the use of a lens. In this embodiment, the prisms would be disposed to be adjusted in the same manner as described hereinabove.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pair of glasses adapted to be used by an individual viewing a CRT screen for easing eye strain comprising:

a pair of lenses, each said lens including a prism being disposed within the thickness of the lens for refracting light from an object to a user's eyes for moving the light to avoid normal convergence of the individual's eyes for reducing eye strain as an individual views a CRT screen; and frames adapted for securing the pair of lenses in an operative position relative to a user's eyes, each said lens is disposed on said frames by right and left lens retainers each of which include a mounting flange attached directly to said frames, a bracket attached to each of said lenses, and adjustment means for connecting each of said mounting flanges and said brackets and for adjusting the lateral disposition of each individual lens relative to an individual's eyes.

2. The pair of glasses according to claim 1, wherein the frames are a conventional frame including ear engaging temples for securing the glasses in an operative position relative to a user's eyes.

3. The pair of glasses according to claim 1, wherein said glasses are adapted for use over an existing pair of glasses of the user.

* * * * *